United States Patent Office 2,891,083
Patented June 16, 1959

2,891,083

FUMARATE AND MIXED GLYCERIDE ADDUCT

Joachim Dazzi, Dayton, Ohio, assignor to Monsanto Chemical Company, St. Louis, Mo., a corporation of Delaware No Drawing. Application July 21, 1955
Serial No. 523,607

7 Claims. (Cl. 260—404.8)

This invention relates to addition products of fumarates and glycerine esters, and more particularly provides new and valuable adducts having a plurality of carboxylate radicals, the method of preparing the same, and vinyl chloride polymers plasticized with said adducts.

According to the invention, there are provided polycarboxylates of the formula

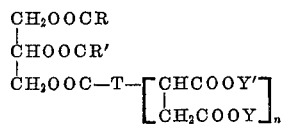

in which R and R' are alkyl radicals of from 1 to 4 carbon atoms, T is a non-conjugated, olefinic hydrocarbon residue of 9 to 23 carbon atoms, Y and Y' are selected from the class consisting of alkyl and alkoxyalkyl radicals of from 1 to 8 carbon atoms, and $n$ is an integer of from 1 to 3.

Polycarboxylates having the above formula are readily prepared by heating, at temperatures of from, say, 150° C. to 250° C., an apropriate alkyl or alkoxyalkyl fumarate with a mixed glyceride of the formula

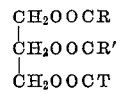

in which R, R' and T are as herein defined. Examples of mixed glycerides having the above formula and useful for the present purpose are the β,γ-diacyl-α-oleins such as β,γ-diaceto-α-olein, β,γ-dipropio-α-olein, β,γ-dibutyro-α-olein, β,γ-divalero-α-olein, β-aceto-γ-butyro-α-olein, β-propio-γ-valero-α-olein, β-butyro - γ - propio-α-olein; the β,γ-diacyl-α-decylenins such as β,γ-diaceto-α-decylenin, β,γ-dibutyro-α-decylenin or β-aceto-γ-propio-α-decylenin; the β,γ-diacyl-α-undecylenins such as β,γ-diaceto-α-undecylenin or β-aceto-γ-butyro-α-undecylenin; the β,γ-diacyl-α-linoleins such as β,γ-dibutyro-α-linolein or β-aceto-γ-valero-α-linolein; the β,γ-diacyl-α-elaidins such as β,γ-diaceto-α-elaidin or β-butyro-γ-propio-α-elaidin; the β,γ-diacyl-α-erucins such as β,γ-dipropio-α-erucin or β-aceto-γ-butyro-α-erucin; the β,γ-diacyl-α-linolenins such as β,γ-diaceto-α-linolenin or β-butyro-γ-valero-α-linolenin, etc. The mixed glycerides are readily available compounds which are known in the art to be prepared, e.g., by transesterification of olefinic fatty acid triglycerides, or by esterification of the monoglyceride of the olefinic acid with two moles of a lower saturated fatty acid or a mixture of such acids.

Fumarates which react with the above glycerides to give the present polycarboxylates have the formula

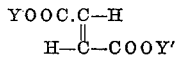

in which Y and Y' are as defined above. Fumarates of this formula include the simple alkyl fumarates such as methyl, ethyl, isopropyl, n-propyl, n-butyl, tert-butyl, isoamyl, n-hexyl, n-heptyl, or isooctyl fumarate; the mixed alkyl fumarates such as ethyl methyl fumarate, methyl n-octyl fumarate and butyl 2-ethylhexyl fumarate; the simple alkoxyalkyl fumarates such as bis(2-methoxyethyl), bis(2-ethoxyethyl), bis(3-ethoxy-n-propyl), or bis(4-butoxybutyl) fumarate; the mixed alkoxyalkyl fumarates such as 3-propoxypropyl 2-ethoxyethyl fumarate or methoxymethyl 2-amyloxyethyl fumarate and fumarates derived from both a fatty alcohol and a glycol monoether such as ethyl 2-ethoxyethyl fumarate or n-amyl 3-propoxypropyl fumarate, etc.

Formation of the present adducts proceeds by addition of the mixed glyceride with from 1 to 3 moles of the fumarate substantially according to the scheme:

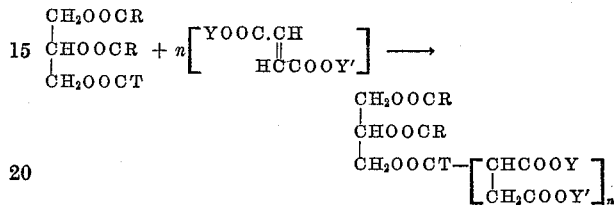

In the addition reaction, the olefinic double bond of the fumarate becomes saturated, whereas the unsaturation of the higher olefinic fatty acid portion of the mixed glyceride is unaffected; i.e., the adduct still contains the olefinic group of the mixed triglyceride. Depending upon the quantity of fumarate present in the reaction mixture, the heating temperature and the duration of heating, as many as three moles of the fumarate may be introduced into the long-chain olefinic fatty acid portion of the mixed triglyceride, the olefinic double bond of said chain serving to activate the carbon atoms thereof without itself being affected. Generally, reaction of the mixed glycerides with the fumarate results in a mixture of adducts in which up to 3 moles of fumarate have combined with said glyceride.

Reaction of the present mixed glycerides with the fumarate to form the present adducts takes place readily by heating the glyceride with the ester in the presence or absence of an inert diluent or solvent at ordinary or superatmospheric pressures. Catalysts may or may not be employed. When operating at atmospheric pressure, temperatures of from, say, 150° C. to 300° C. and preferably from 200° C. to 250° C. are used. When working with readily polymerizable fumarates, an inhibitor of polymerization may be incorporated into the reaction mixture. The number of carboalkoxy groups introduced into the oil depends upon the quantity and nature of the individual ester used, and upon the reaction conditions employed. Generally, operation within the higher temperature ranges, i.e., at temperatures of above, say, 210° C. and below the decomposition point of any of the reactants leads to introduction of more carboalkoxy groups than does operation at the lower temperatures. Usually, the lower alkyl fumarates are more reactive than the higher alkyl fumarates. In view of the effect of the reaction conditions and nature of the fumarates upon the extent of carboalkoxylation, it is recommended that for each initial run there be experimentally determined the operating conditions which should be observed for obtaining the desired degree of carboalkoxylation.

Since the presently useful fumarates are generally miscible with most of the present mixed glycerides under the reaction conditions used, no extraneous solvent or diluent usually need be employed. However, in order to facilitate handling of some of the glycerides, it may be advantageous to work in an inert, extraneous diluent or solvent, e.g., a liquid hydrocarbon or a liquid derivative thereof such as high-boiling aliphatic hydrocarbon such as kerosene, halogenated aliphatic hydrocarbons, etc. When operating at atmospheric pressure such diluent is generally removed before reaction of the glyceride with the fumarate occurs, due to the high temperature used. For successful reaction, the diluent may or may not be present.

The reaction time may vary from, say, a few minutes to 24 hours, a reaction time of, say, from 2 to 8 hours being recommended when it is desired to obtain a preponderant yield of products having a high carboalkoxy content. The product is generally a viscous liquid which comprises a mixture of adducts of varying carboalkoxy content and unreacted initial reagents. Any unreacted material may be readily recovered, e.g., by distillation, and the residue of mixed adducts may be used as such for a variety of industrial purposes.

The present adducts are advantageously employed for a variety of industrial and agricultural applications, for example, as thickening agents in the preparation of emollients and greases, as blending agents in the preparation of new and improved resinous compositions, as intermediates for the preparation of surfactants, etc. They are particularly valuable as polyvinyl chloride plasticizers having the property of increasing the low temperature flexibility properties of this polymer without adversely affecting the heat resistance thereof.

The present invention is further illustrated, but not limited, by the following examples:

*Example 1*

To a flask equipped with reflux condenser and mechanical stirrer there were charged 132 grams (0.3 mole) of β,γ-diacetyl-α-olein and 136.8 grams (0.6 mole) of butyl fumarate. The mixture was refluxed in a nitrogen atmosphere for 4 hours at 240° C. to 241° C. Distillation of the resulting reaction product at a pressure of 1 mm. of mercury and also in a nitrogen atmosphere to remove material boiling below 230° C./1 mm. (pot temperature 250° C.) gave as residue the viscous 1:1 adduct of β,γ-diaceto-α-olein and butyl fumarate which was found to have a saponification value of 138 as against 134, the calculated value.

When β,γ-diacetyl-α-olein is heated with 4 molar equivalents of the butyl fumarate and heating is conducted at about 240° C. for 10 hours instead of 4 hours, the distillation residue (B.P. >230° C. at 1 mm.) is a mixture of adducts in which from 1 to 3 moles of said fumarate are combined with the diacetoolein.

*Example 2*

This example shows testing of the 1:1 adduct of the above example as a plasticizer for polyvinyl chloride.

Sixty parts of polyvinyl chloride and forty parts by weight of the adduct of Example 1 were mixed on a rolling mill to a homogeneous blend. During the milling there was observed substantially no fuming and discoloration. A molded sheet of the mixture was clear, transparent, and substantially colorless. Testing of the molded sheet for low temperature flexibility, according to the Clash-Berg method, gave a value of minus 22° C. Tests on the volatility characteristics of the plasticized composition employing the carbon absorption method of the Society of the Plastics Industry gave a value of 1.0 percent which showed excellent retention of plasticizer and indicated good temperature characteristics of the composition. The plasticized material had a water-absorption value of 0.24 percent after immersion in water for 24 hours. When subjected to heat at a temperature of 325° F. for a period of 30 minutes, the clarity and color of the molded sheet were substantially unchanged.

When subjected to the same evaluation procedures, polyvinyl chloride plasticized with the unreacted β,γ-diaceto-α-olein was found to be incompatible with the polyvinyl chloride.

*Example 3*

This example illustrates resistance of the 1.1 adduct of Example 1 to liquid hydrocarbons.

Sixty parts by weight of polyvinyl chloride and forty parts by weight of said adduct were milled together to a homogeneous blend. Molded test specimens were prepared therefrom, said speciments being circles having a diameter of two inches and a thickness of 2 mm. The test specimens were immersed in kerosene for 24 hours at a temperature of 50° C., wiped dry, and then oven-dried at 50° C. for 44 hours. The dried specimens showed a weight change of minus 3.5 percent as compared to the initial weight thereof.

This substantial non-extractibility of the present adduct by kerosene from polyvinyl chloride resins plasticized by the same is remarkable in that commonly employed plasticizers are readily extracted when submitted to the same test. Thus, like-dimensioned molded test speciments of a milled blend consisting of 60 percent polyvinyl chloride and 40 percent dioctyl phthalate showed a 76.7 percent loss of plasticizer.

Instead of the adduct of butyl fumarate and β,γ-diaceto-α-olein, other adducts of alkyl or alkoxyalkyl fumarates and diacylated mono-glycerides of the higher unsaturated acids give similarly valuable plasticized polyvinyl chloride compositions. Thus, by employing 40 parts by weight of the adduct of methyl, n-octyl, 2-butoxyethyl or 3-methoxypropyl ethyl fumarate and a mixed glyceride such as β,γ-dibutyro-α-linolein or β-aceto-γ-propio-α-undecenylin with 60 parts by weight of polyvinyl chloride or with 60 parts by weight of a vinyl chloride-vinyl acetate copolymer known to the trade as "Vinylite," there are obtained clear, colorless compositions of very good flexibility and stability.

While the above examples show only a composition in which the ratio of plasticizer to polymer content is 40:60, the content of adduct to polyvinyl chloride may be widely varied, depending upon the properties desired in the final product. For many purposes, a plasticizer content of say, from only 10 percent to 20 percent is preferred.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl fluoride, vinylidene chlorofluoride, vinylidene chloride, methyl methacrylate, acrylonitrile, etc. Preferably, such copolymers have a high vinyl chloride content, i.e., a vinyl chloride content of at least 70 percent of vinyl chloride and up to 30 percent by weight of a copolymerizable monomer.

The plasticized polyvinyl halide compositions of the present invention have good thermal stability; however, for many purposes it may be advantageous to use known stabilizers in the plasticized compositions. Also, while the present adducts are of general utility in softening vinyl chloride polymers, they may be used as the only plasticizing component in a compounded vinyl chloride polymer, or they may be used in conjunction with other plasticizers.

What is claimed is:

1. An adduct of a fumarate and a mixed glyceride, said adduct having the formula

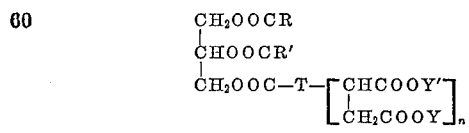

in which R and R' are alkyl radicals of from 1 to 4 carbon atoms, T is a non-conjugated, olefinic, hydrocarbon residue of from 9 to 23 carbon atoms, Y and Y' are selected from the class consisting of alkyl and alkoxyalkyl radicals of from 1 to 8 carbon atoms and $n$ is an integer of from 1 to 3.

2. An adduct of an alkyl fumarate having from 1 to 8 carbon atoms in the alkyl radical and a β,γ-diacylolein having from 2 to 5 carbon atoms in the acyl radical, from 1 to 3 moles of said fumarate being combined at the carbon chain of the oleic acid portion of the molecule.

3. An adduct of butyl fumarate and β,γ-diacetoolein, one mole of said fumarate being combined at the carbon chain of the oleic acid portion of the molecule.

4. A resinous composition comprising a vinyl chloride polymer plasticized with an adduct having the formula

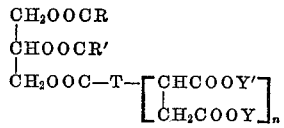

in which R and R' are alkyl radicals of from 1 to 4 carbon atoms, T is a non-conjugated, olefinic hydrocarbon residue of from 9 to 23 carbon atoms, Y and Y' are selected from the class consisting of alkyl and alkoxyalkyl radicals of from 1 to 8 carbon atoms and $n$ is an integer of from 1 to 3.

5. A resinous composition comprising polyvinyl chloride plasticized with an adduct having the formula

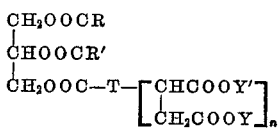

in which R and R' are alkyl radicals of from 1 to 4 carbon atoms, T is a non-conjugated, olefinic hydrocarbon residue of from 9 to 23 carbon atoms, Y and Y' are selected from the class consisting of alkyl and alkoxyalkyl radicals of from 1 to 8 carbon atoms and $n$ is an integer of from 1 to 3.

6. A resinous composition comprising a copolymer of at least 70 percent by weight of vinyl chloride and up to 30 percent by weight of an unsaturated monomer copolymerizable therewith, said copolymer being plasticized with an adduct having the formula

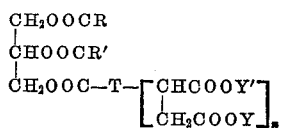

in which R and R' are alkyl radicals of from 1 to 4 carbon atoms, T is a non-conjugated, olefinic hydrocarbon residue of from 9 to 23 carbon atoms, Y and Y' are selected from the class consisting of alkyl and alkoxyalkyl radicals of from 1 to 8 carbon atoms and $n$ is an integer of from 1 to 3.

7. A resinous composition comprising polyvinyl chloride plasticized with an adduct of butyl fumarate and β,γ-diacetoolein, one mole of said fumarate being combined at the carbon chain of the oleic acid portion of the molecule.

References Cited in the file of this patent

UNITED STATES PATENTS

| | | |
|---|---|---|
| 2,342,113 | Blair | Feb. 22, 1944 |
| 2,357,937 | De Groote | Sep. 12, 1944 |
| 2,423,364 | Blair et al. | July 1, 1947 |
| 2,545,811 | Hetzel | Mar. 20, 1951 |
| 2,553,996 | Abbott | May 22, 1951 |
| 2,559,510 | Mikeska et al. | July 3, 1951 |
| 2,757,151 | Dazzi | July 31, 1956 |